April 8, 1941.  H. B. LEWIS  2,237,677
HOOD FOR MOTOR DRIVE VEHICLES
Filed Sept. 30, 1940  2 Sheets-Sheet 1

INVENTOR
HOWARD B. LEWIS
BY HARRIS, KIECH, FOSTER & HARRIS
ATTORNEYS.

April 8, 1941.  H. B. LEWIS  2,237,677
HOOD FOR MOTOR DRIVE VEHICLES
Filed Sept. 30, 1940   2 Sheets-Sheet 2

INVENTOR
HOWARD B. LEWIS
BY HARRIS, KIECH, FOSTER & HARRIS
FOR THE FIRM
ATTORNEYS.

Patented Apr. 8, 1941

2,237,677

UNITED STATES PATENT OFFICE 2,237,677

HOOD FOR MOTOR DRIVE VEHICLES

Howard B. Lewis, Venice, Calif., assignor to Salsbury Corporation, Inglewood, Calif., a corporation of California Application September 30, 1940, Serial No. 359,059

2 Claims. (Cl. 180—33)

My invention relates to motor vehicles and is particularly applicable to light vehicles of the type to be described.

In such vehicle two wheels only are usually provided. The rear or driving wheel is driven by a motor, ordinarily an internal combustion engine. The front or steering wheel may be mounted like the front wheel of a bicycle or motorcycle. In these vehicles the wheels are usually about 12" in diameter. Either or both of said wheels may be spring suspended from a frame, the axle of the rear wheel being in most cases held in such a manner that its axis bears a fixed relationship to the frame, and the axle of the front wheel being free to turn with relation to said frame so that the vehicle can be steered thereby. The steering mechanism projects upwardly from the front of the frame and the engine while parts of the driving mechanism project upwardly from the rear of the frame. Secured to the top of the frame between the steering mechanism and the engine is a flat platform which is approximately horizontal when the vehicle is being used and upon which the feet of the user are supported.

Vehicles such as above described are now in general use filling a need between that met by the bicycle and that met by the automobile. Such vehicles are light in weight, low in first cost, low in gasoline consumption, and have a low upkeep cost. In such vehicles it is customary to provide a hood which encloses the engine and to provide a seat supported on this hood. The user, with his feet on the platform, sits on the seat in a position such that he can operate the steering mechanism and the engine controls, which controls are usually carried on the steering mechanism.

The present invention has for its object the provision of a novel form of enclosing hood. It is highly desirable that the hood shall enclose all of the engine and transmission mechanism that projects above the frame. It is also desirable that the engine and the gasoline tank which are supported inside the hood be readily accessible for the purpose of refilling the tank and servicing the engine and mechanism. This object is attained by the novel form of hood and attachment means therefor which is disclosed herein.

In the drawings which are for illustrative purposes only:

Figure 1:
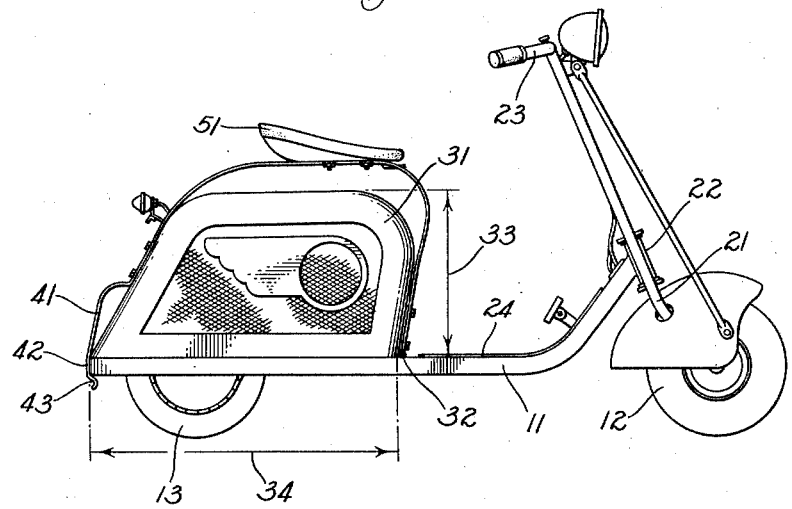
Fig. 1 is a side view of a motor driven vehicle embodying my novel enclosing hood.

As shown in these drawings, a main frame 11 is provided, the front or steering wheel 12 being at the forward end of said frame 11 and the driving wheel 13 being at the rearward end of the frame. The wheel 13 is driven from an internal combustion engine 14 which is carried by said frame 11 and projects upwardly therefrom. A gasoline tank 15 is mounted on supports 16 close to the engine and has a standard filling cap 17.

The front wheel 12 is carried by a fork 21 which is free to turn about a fork pin 22 carried in the front of the frame 11, handle bars 23 being provided through which the rider may control the angular position of the front wheel 12 with relation to the frame 11 and thus steer the vehicle. The usual controls for the engine may be provided on the fork 21. Between the steering mechanism and the engine, the frame 11 is provided with a platform 24 on which the rider's feet are supported.

Figure 2:
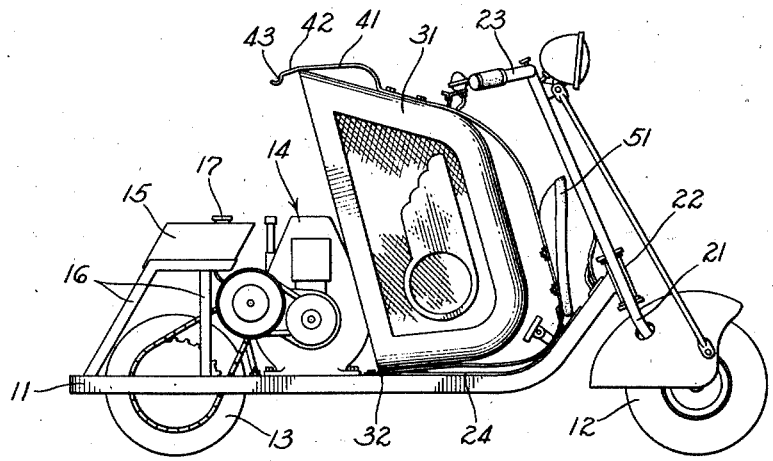
Fig. 2 is a view similar to Fig. 1 showing the enclosing hood in open position.
Figure 4:
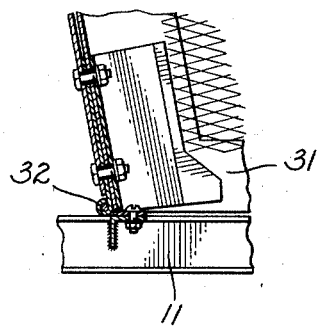
Fig. 4 is a fragmentary section taken on the line 4—4 of Fig. 3.
Figure 3:
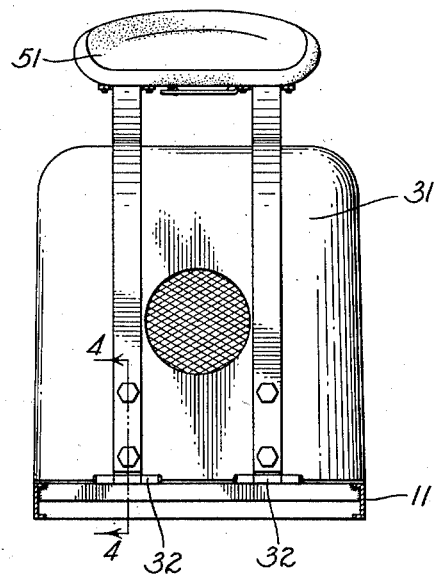
Fig. 3 is a front view of the enclosing hood.
Figure 5:
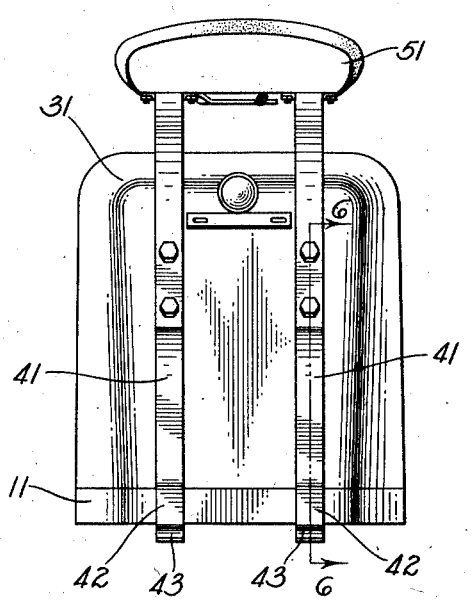
Fig. 5 is a rear view of the enclosing hood.
Figure 6:
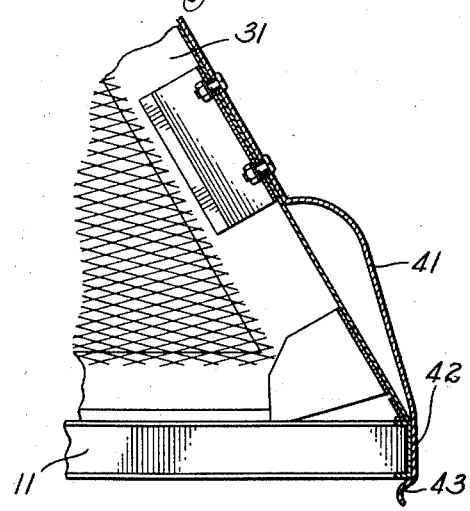
Fig. 6 is a fragmentary section taken on the line 6—6 of Fig. 5.

For the purpose of enclosing the engine, a hood 31 is provided. In the form of the invention shown, the lower edge of the front end of the hood 31 is secured by hinges 32 to the frame 11. The hood 31 has a height indicated by a dimension line 33 which is less than the length indicated by a dimension line 34 of the platform 24. Due to this dimensional relationship, the hood can be turned through an angle of nearly 90° about the hinges 32 from the enclosing position shown in Fig. 1 to the open position shown in Fig. 2. When so turned to open position, the hood occupies a position between the steering mechanism and the engine 14 so that the engine with its associated mechanism and the gasoline tank 15 are rendered fully accessible. This arrangment for mounting the hood makes it unnecessary to dispose filling devices for oil or gasoline adjacent the outer surfaces of the hood, and makes the engine and mechanism readily accessible for inspection or servicing.

For the purpose of locking the hood 31 solidly to the frame 11 when the hood is in the enclosing position, various sorts of releasable fastenings may be used, the simplest probably being bolts. I, however, provide a simple form of readily releasable latching mechanism 41 in the form of two latches 42, each of which is formed of spring steel rigidly secured to the hood. The lower end of each latch is provided with a hook 43 which snaps under the frame 11 when the hood is closed, and thus holds the hood rigidly to the frame. The latches 42 can be readily released by the rider by pulling rearwardly on them. The latches are so shaped that they also act as spring bumpers to receive the impact of other vehicles.

Secured by any suitable means on or above the hood is a seat 51 on which the rider may sit.

It will be understood that my invention includes the novel conception of an enclosing hood for the engine which is of such size and shape that it can be turned to an open position above the platform 24 and between the fork 21 and the engine 14, but which in normal closed position will cover or enclose the engine and mechanism. It further includes the novel conception of hinging the hood to the frame so that it can be turned into this position. It still further includes the novel conception of using a spring latching mechanism at the rear of the hood for locking the hood rigidly to the frame.

I claim as my invention:

1. In a motor vehicle of the type described having a driving wheel which is driven by an engine through suitable driving mechanism, a steering wheel whose angular position with relation to the body of the vehicle can be controlled by suitable steering mechanism, and a frame supported by said wheels, said steering mechanism extending upwardly from the forward portion of said frame, and said engine extending upwardly from the rearward portion of said frame, the combination of: a hood supported on said frame and enclosing said engine; hinges securing the front end of said hood to said frame; and releasable means rigidly securing said hood to said frame in an engine enclosing normal position in which said hood so encloses said engine, the proportions of said hood being such that when it is turned about said hinges through an angle of approximately 90° the hood lies between said steering mechanism and said engine, said hood being of such a shape that it will substantially clear all parts enclosed thereby as it is so turned.

2. In a motor vehicle of the type described having a driving wheel which is driven by an engine through suitable driving mechanism, a steering wheel whose angular position with relation to the body of the vehicle can be controlled by suitable steering mechanism, and a frame supported by said wheels, said steering mechanism extending upwardly from the forward portion of said frame, and said engine extending upwardly from the rearward portion of said frame, the combination of: a hood supported on said frame and enclosing said engine; hinges securing the front end of said hood to said frame; and a releasable latch by which said hood may be rigidly locked to said frame in said enclosing position, the proportions of said hood being such that when it is turned about said hinges through an angle of approximately 90° the hood lies between said steering mechanism and said engine, said hood being of such a shape that it will substantially clear all parts enclosed thereby as it is so turned.

HOWARD B. LEWIS.